United States Patent [19]
Hanna

[11] Patent Number: 5,488,675
[45] Date of Patent: Jan. 30, 1996

[54] STABILIZING ESTIMATE OF LOCATION OF TARGET REGION INFERRED FROM TRACKED MULTIPLE LANDMARK REGIONS OF A VIDEO IMAGE

[75] Inventor: Keith J. Hanna, Princeton, N.J.

[73] Assignee: David Sarnoff Research Center, Inc., Princeton, N.J.

[21] Appl. No.: 222,207

[22] Filed: Mar. 31, 1994

[51] Int. Cl.⁶ .................................................. H04N 9/74
[52] U.S. Cl. ........................ 382/284; 382/103; 382/291; 382/298; 348/589; 348/590
[58] Field of Search ............................ 382/1, 22, 57, 382/41, 103, 284, 291, 298; 348/578, 580, 584, 589, 590, 593; 395/118, 133, 127, 135

[56] References Cited

U.S. PATENT DOCUMENTS

| | | | |
|---|---|---|---|
| 4,393,394 | 7/1983 | McCoy | 348/587 |
| 4,539,585 | 9/1985 | Spackova et al. | 382/41 |
| 5,264,933 | 11/1993 | Rosser et al. | 348/578 |
| 5,353,392 | 10/1994 | Luquet et al. | 395/127 |

*Primary Examiner*—Leo Boudreau
*Assistant Examiner*—David R. Anderson
*Attorney, Agent, or Firm*—William J. Burke

[57] ABSTRACT

Any of multiple landmark regions of a scene being viewed by an image sensor are used for inferring the location of a target region of the scene in which a pattern is to be inserted in order to avoid the problem of the view of a region being occluded. Because of changes, such as the pointing angle of the sensor, there is a slight difference in size and position in the location of a target region inferred from one landmark region and from another landmark region. this results in a jitter when a first landmark region being used for inferring the location of a target region is replaced by a second landmark region in response to the first landmark region being occluded. This jitter is eliminated by deriving an error-correcting component that compensates for the aforesaid slight difference in size and position in the location of a target region inferred from different landmark regions.

5 Claims, 3 Drawing Sheets

STABILIZING ESTIMATE OF LOCATION OF TARGET REGION INFERRED FROM TRACKED MULTIPLE LANDMARK REGIONS OF A VIDEO IMAGE

The invention relates to an improved technique suitable for use in the pattern-key insertion of extraneous image data in a target region of a background image such as a video image.

BACKGROUND OF THE INVENTION

Incorporated herein by reference is the disclosure of copending U.S. patent application Ser. No. 08/115,810, filed Sep. 3, 1993, and entitled "Video Merging Employing Pattern-key Insertion", now abandoned, which is assigned to the same assignee as the present application. As taught in that patent application, pattern-key insertion is used to derive a composite image by merging foreground and background implementation techniques used for this purpose is one in which an estimate of the location of a target region can be inferred from the tracked location of any of multiple landmark regions in the background image. The location of each of the multiple landmark regions may be displaced in a different direction from the location of the target region, so that in case the video scene is such that the target region itself moves partially or completely beyond a particular edge of the image, at least one of the tracked multiple landmark regions remains within the image so that even if the location of the target region itself is partially or wholly outside of the image field of view, inferred tracking of the target region itself can still be continuously maintained. In addition, Any of the tracked multiple landmark regions in the image may be occluded at times by the presence of a foreground object in the scene, so it cannot be used at such times for inferring the the location of the target region. In such a case, another of the tracked multiple landmark regions in the image must be used instead. However, it has been found that switching from one tracked multiple landmark region to another tracked multiple landmark region for use in inferring the location of the target pattern results in model errors that cause unstable estimates of the location of the target pattern.

Such model errors could be reduced by fitting higher order models to the respective tracked multiple landmark regions so that they are tracked better. Such higher order models are unstable to estimate from a single image frame, and biased errors in local estimates introduce estimation errors that are difficult to model a priori.

The present invention is directed to an improved technique for deriving stable estimates of the location of the target pattern when one tracked multiple landmark region is switched to another tracked multiple landmark region for use in inferring the location of a target pattern.

SUMMARY OF INVENTION

The invention is directed to an improvement in an image processing method for inserting a given pattern at a target region having a particular location with respect to a scene being viewed by an image sensor such as a television camera, wherein the scene includes at least two landmark regions displaced in location from one another. The method comprises one computation step for inferring the size and position of the particular location within each of successive image frames of the scene from the size and position of a first one of the landmark regions represented within each of successive image flames of the scene and another computation step for independently inferring the size and position of the particular location within each of successive image flames of the scene from the size and position of a second one of the landmark regions represented within each of the successive image frames of the scene. This results in the likelihood that there may be a difference in the size and position of the particular location within each of successive image frames of the scene inferred from the size and position of the second one of the landmark regions with respect to the size and position of the particular location within each of successive image flames of the scene inferred from the size and position of the first one of the landmark regions.

The improvement in this method comprises the additional step of modifying the size and position of the particular location within at least one of the successive image flames of the scene inferred from the size and position of the second one of said landmark regions within that one of the successive image flames so that it is substantially the same as the size and position of the particular location within that one of the successive image flames of the scene inferred from the size and position of the first one of the landmark regions.

DESCRIPTION OF THE PREFERRED EMBODIMENTS

Figure 1:
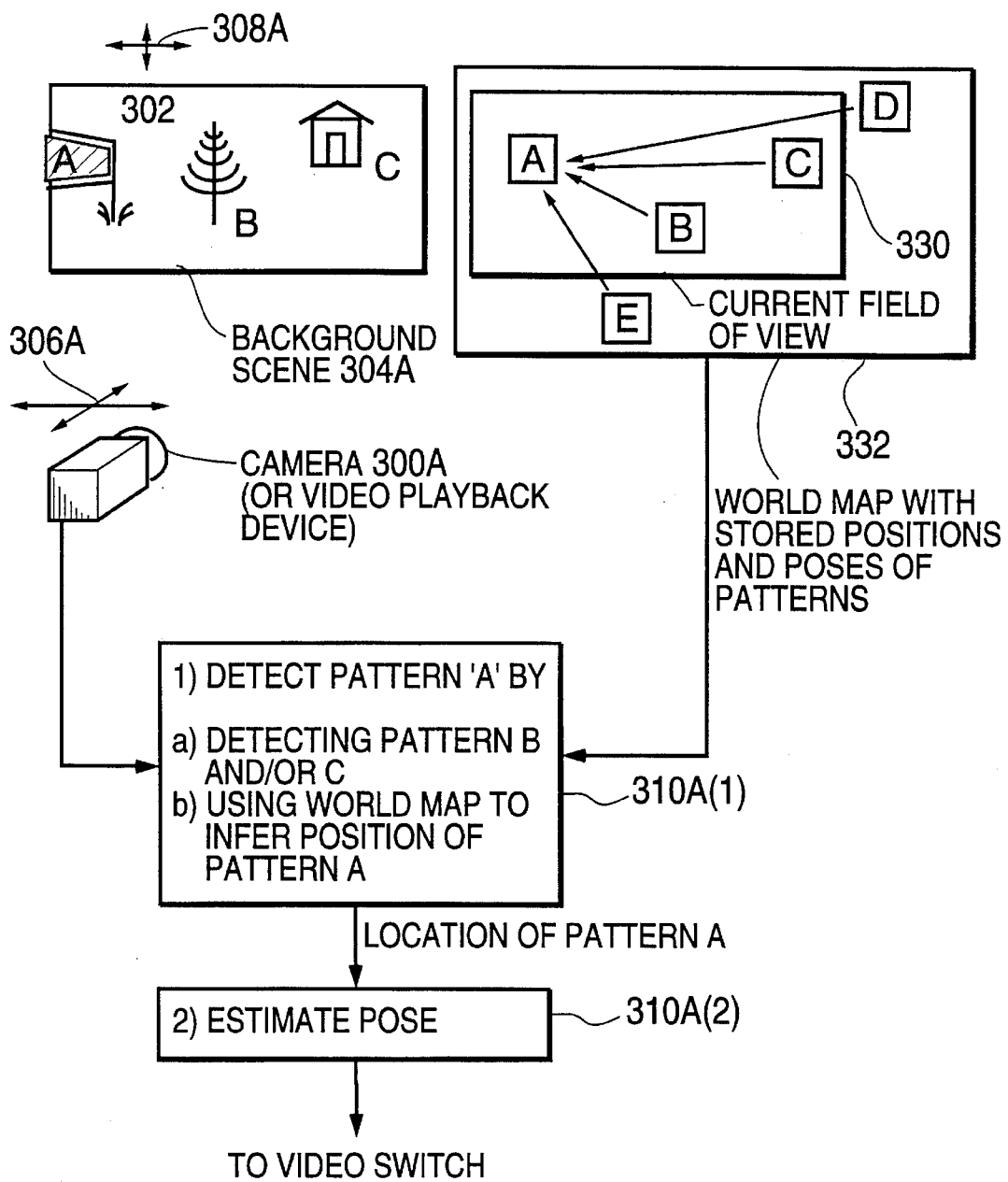
FIG. 1, which is identical to FIG. 6 of the aforesaid patent application, shows an example of landmark region tracking.

The aforesaid patent application is broadly directed to various ways of replacing a first target pattern in an image, such as a video image, (which first target pattern may be located on a billboard) with an inserted second target pattern. As taught therein, the location of the first target pattern may be detected directly or, alternatively, indirectly by inferring its position from the respective positions of one or multiple landmarks in the scene. FIG. 1 (which is identical to FIG. 6 of the aforesaid patent application) shows one indirect way this may be accomplished.

Referring to FIG. 1, background scene 304A consists of the current field of view of image sensor 300A such as a television camera. As indicated, the current field of view includes the target (billboard 302 comprising logo pattern "A") and landmarks B (a tree) and C (a house), with each of the target and landmarks being positionally displaced from one another. As indicated by blocks 330, the current field of view, and 332, the world map, the target A and landmarks B and C, comprising the current field of view 330 of a landmark region, form only a portion of the stored relative positions and poses of patterns of the world map 332 of the landmark region. These stored patterns also include landmarks D and E which happen to be outside of the current field of view of the landmark region, but may be included in an earlier or later field of view of the landmark region. Means 310A(1), responsive to inputs thereto from both sensor 300A and block 332, is able to derive an output therefrom indicative of the location of target A whether pattern A is completely in the field of view, is partially in the field of view, or only one or more landmarks is in the field of view. Means 310A(1) detects pattern A by detecting pattern B and/or C and using world map 332 to infer the position of pattern A. The output from means 310A(1), the location of pattern A, is applied to means 310A(2), not shown, which estimates pose in the manner described above. The output of means 310A(2) is then connected to a video switch (not shown).

Landmark region tracking is also useful when the target itself happens to be occluded in the current field of view, so that its location must be inferred from the locations of one or more non-occluded landmarks.

Landmark region tracking will only solve the problem if the target pattern leaves or enters the field of view in a particular direction. In the example shown in FIG. 1, where each of the landmark patterns within the landmark region lies to the right of the target pattern, landmark pattern tracking only solves the problem if the target pattern leaves the field of view on the left-hand-side of the image.

Multiple landmark tracking overcomes the problem. Instead of detecting a single landmark (or target) pattern, the system could choose to detect one or more landmark patterns within different landmark regions depending on which pattern(s) contributed most to inferring the position of the target pattern. For example, if the target pattern is leaving the field of view on the left-hand-side, then the system could elect to detect a landmark pattern towards the right of the target pattern. On the other hand, if the target pattern is leaving the field of view on the right-hand-side, the system could elect to detect a landmark pattern towards the left of the target pattern. If more than one landmark pattern is visible, the system could elect to detect more than one landmark pattern at any one time in order to infer the position of the target pattern even more precisely. As taught in the prior art, this system can be implemented using the results of pattern detection in a previous image in the background sequence to control pattern detection in the next image of the sequence. Specifically, the system uses the position of the landmark pattern that was detected in the previous image to infer the approximate positions of other landmark patterns in the previous image. These positions are inferred in the same way the position of the target pattern is inferred from a single landmark pattern. The system then elects to detect in the current image the landmark pattern that was nearest the target pattern in the previous image, and that was sufficiently far from the border of the previous image. As a result, when a detected landmark region becomes close to leaving the field of view of the background scene, the system elects to detect another landmark region that is further from the image border.

It has been found that pattern insertion of the type described above is useful for inserting a particular advertising Logo pattern in the displayed image of a televised sporting event that appears to be physically part of the scene being televised, although, in fact, that particular advertising Logo pattern is not actually there. For illustrative purposes, assume that a tennis match is to be televised from a tennis stadium and that the televised match sponsor has a first given advertising Logo pattern, but that a competitor of the sponsor has its second given advertising Logo pattern L physically attached to a stadium wall that is part of the scene being televised (shown in FIG. 2). In this case, the sponsor would like to have his competitor's second given advertising Logo pattern replaced by his own inserted first given advertising Logo pattern in the displayed televised image. Even in the case where there is no Logo pattern physically attached to a stadium wall (shown in FIG. 2'), the sponsor would still like to have his own first given advertising Logo pattern inserted in the displayed televised image of the stadium wall.

Figure 2A:
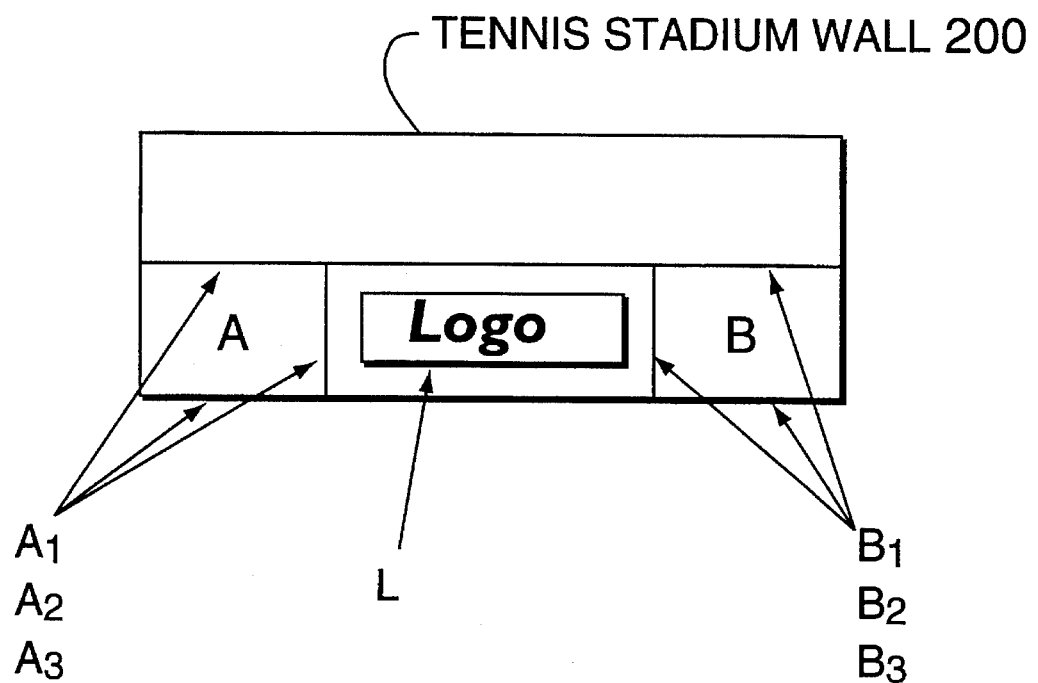
FIG. 2 diagrammatically shows an actual tennis stadium wall having a given Logo pattern physically disposed thereon at a particular location thereof and FIG. 2' diagrammatically shows the actual tennis stadium wall without any Logo disposed thereon.
Figure 2B:
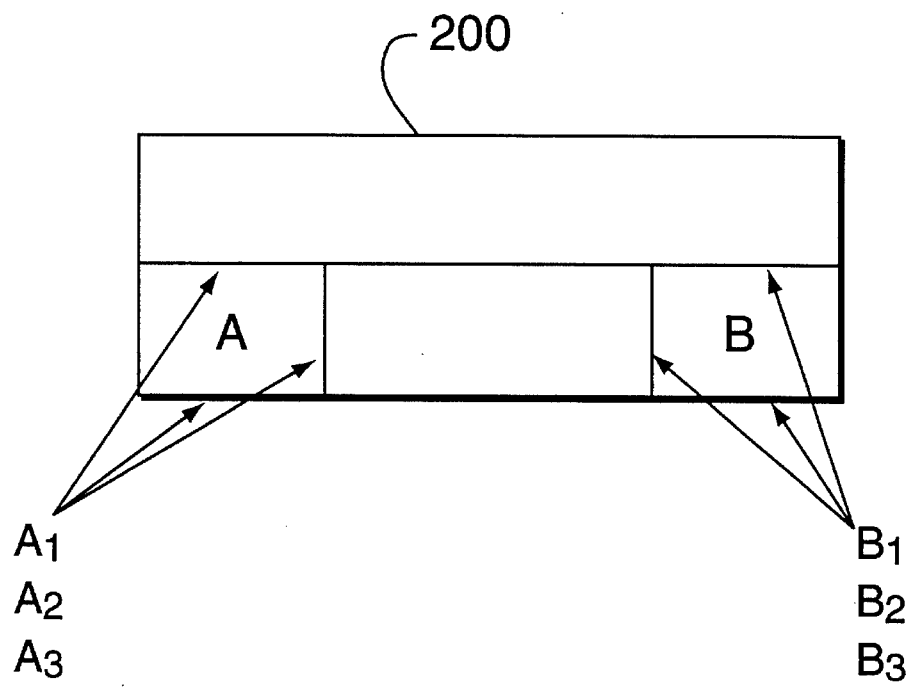

Both FIGS. 2 and 2' are simplified assumed examples of the type of graphic data which is on tennis stadium wall 200. In particular, the tennis stadium wall itself includes thereon landmark regions A and B offset, respectively, specified measured distances to the left and to the right of the location of the Logo to be inserted. As shown, landmark region A is defined by a set of lines $A_1$, $A_2$ and $A_3$, comprising an upper horizontal line, a lower horizontal line a given distance below the upper horizontal line and a vertical line connecting these horizontal lines, and landmark region B is defined by a set of lines $B_1$, $B_2$ and $B_3$, also comprising an upper horizontal line, a lower horizontal line this given distance below the upper horizontal line and a vertical line connecting these horizontal lines.

It is plain that the location of the Logo to be inserted computed from the set of actual measured lines $A_1$, $A_2$ and $A_3$ of landmark region A on the physical wall itself would be identical to the location of the Logo to be inserted independently computed from the set of actual measured lines $B_1$, $B_2$ and $B_3$ of landmark region B on the physical wall. However, rather than being able to compute the location of the Logo to be inserted from these regions on the physical wall itself, it is necessary to infer the location of the Logo to be inserted from either landmark region A or landmark region B in the ongoing images of the wall viewed by an image sensor. This involves taking into account changes in the relative location (translation) from one image to the next whenever the operator changes the pointing angle of the sensor viewing the wall slightly to the left or right, and changes made by the operator in the relative size (zoom) of the landmark regions from one image to the next.

Figure 3A:
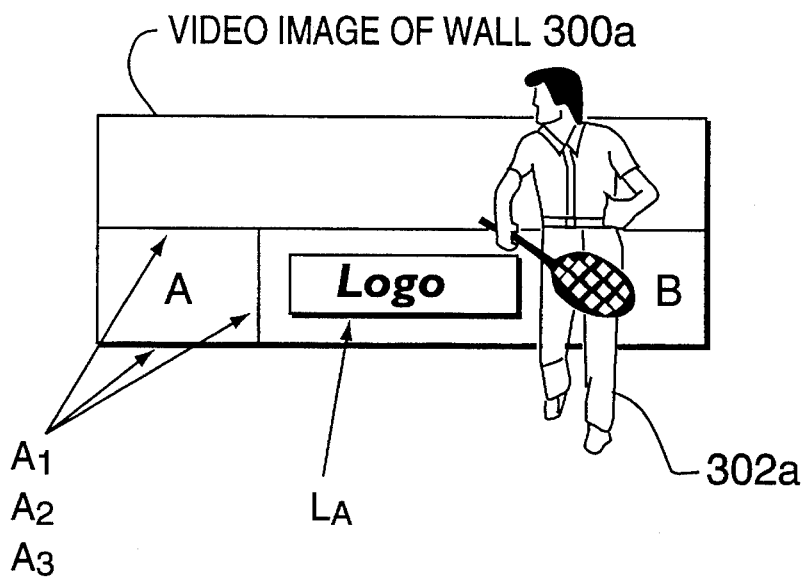
FIGS. 3a and 3b, taken together, diagrammatically illustrate a stabilization problem that exists in the display of an image of an ongoing tennis match wherein multiple landmark region tracking is used to continuously infer the location of an inserted Logo pattern, and FIG. 3c diagrammatically illustrates a solution to this stabilization problem.
Figure 3B:
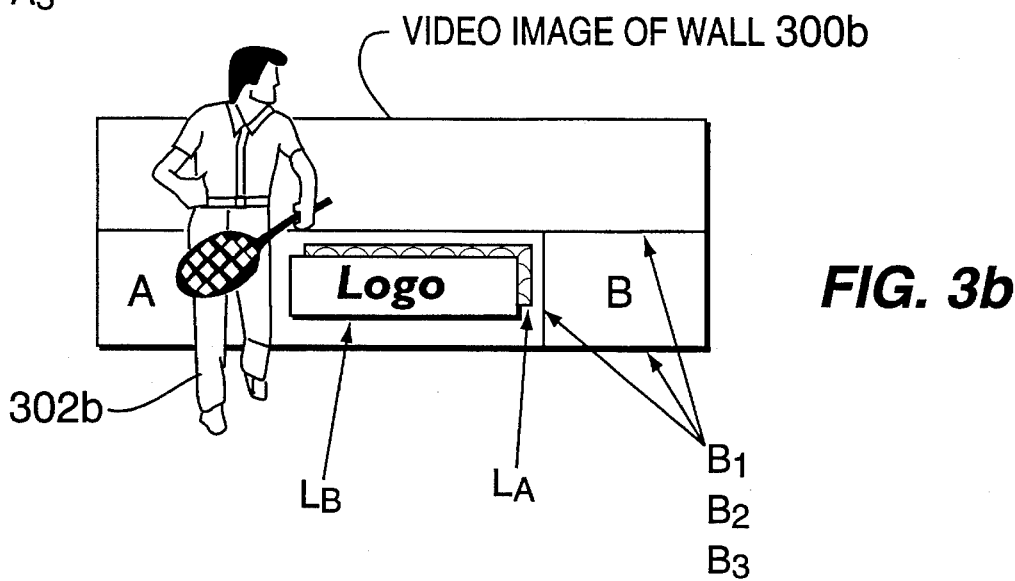

FIG. 3a shows art image 300a in which a tennis player 302a is occluding the view of landmark region B. In this case, the location of Logo $L_A$ is inferred from landmark region A. FIG. 3b shows an image 300b in which a tennis player 302b is occluding the view of landmark region A. In this case, the location of Logo $L_B$ is inferred from landmark region B. However, as indicated in FIG. 3b, the inferred location of Logo $L_B$ derived from landmark region B does not register with the inferred location of Logo $L_A$ derived from landmark region A. This results from translation and zoom values for landmark regions A and B differing somewhat from one another when the pointing angle of the sensor viewing the wall is not exactly normal to the wall. Thus, switching between the use of one of landmark regions A and B to the other of landmark regions A and B to infer the location of the Logo whenever one of these landmark regions is occluded in the image causes an undesirable jitter in the position of the Logo to take place in the image display. The present invention is directed to avoiding such jitter by adding suitable error corrections $\Delta b_1$, $\Delta b_2$ and $\Delta b_3$ to $B_1$, $B_2$ and $B_3$, as indicated in FIG. 3c, so that the inferred location of Logo $L_B$ in image 300c becomes identical to the inferred location of Logo $L_A$, despite the fact that tennis player 302c is occluding landmark region A in image 300c.

Figure 3C:
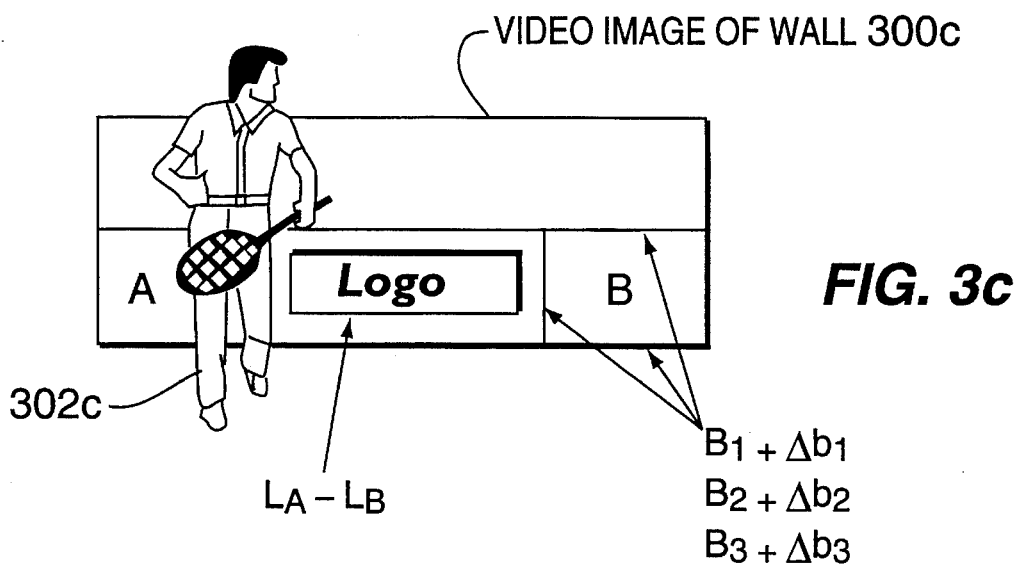

In the simplified assumed examples of the type of graphic data shown in FIGS. 2 and 2' and in FIGS. 3a, 3b and 3c, a total of only the six parameters (i.e., lines) $A_1$, $A_2$, $A_3$, $B_1$, $B_2$ and $B_3$ are available to define the two landmark regions A and B. However, in practice, there may be a substantially larger number (e.g., 20) parameters (e.g., lines and corner points) available. This permits a great number of landmark regions to be defined, with each landmark region being defined by a separate subset of a few of the large number of available parameters. In this case, the location of the Logo inferred from any one of the landmark regions can be brought into registration with the location of the Logo inferred from any other of the landmark regions by adding on suitable error corrections which may be computed as discussed below.

Positions $(X_m, Y_m)$ of lines or points in the images may be recovered with a sub-pixel measurement precision of each line or point in accordance with the teachings of the aforesaid patent application. A line cannot be defined by a single point. Therefore, confidence weights $W_x$, $W_y$ are associated with each $X_m$, $Y_m$. For a vertical edge, $W_y 0$ and $W_x=1$, since only horizontal position can be recovered. For a horizontal edge, $W_x=0$ and $W_y 1$, since only vertical position can be recovered. For a corner (i.e., an intersection of vertical and horizontal lines) $W_x=1$ and $W_y 1$, since both its vertical and horizontal position can be recovered. These weights are recoverable by computing second moments of the auto-correlation image of the line or point, or can be selected by hand.

The position of each line or point in the model image is $(X_p, Y_p)$. In the example shown in FIG. 3a, 3b, and 3c, the Logo $L_A$ inferred from landmark region A is the model image. To compensate for errors in geometrical transformation, error correction terms are added to each $(X_p, Y_p)$ to give $(X_{pp}, Y_{pp})$. In the example shown in FIGS. 3a, 3b, and 3c, the position of each line or point in Logo $L_B$ inferred from landmark region B is $X_{pp}, Y_{pp}$. The set $(X_{pp}, Y_{pp})$ may be related to the set $(X_m, Y_m)$ by a zoom and translational geometric transformation. The zoom error K, the translation error $T_x$ in the X direction and the translation error $T_y$ in the Y direction can be recovered using a least squares method to find the values of K, $T_x$ and $T_y$ that minimize the following error function;

$$\epsilon = \Sigma W_x(X_m - (KX_{pp} + T_x))^2 + \Sigma W_y(Y_m - (KY_{pp} + T_y))^2$$

This error function can be solved by differentiating $\epsilon$ with respect to each of K, $T_x$ and $T_y$, giving three equations that can be written in matrix form as $\alpha * S = \beta$, where $$\alpha = \begin{bmatrix} \Sigma W_x X_{pp}^2 + \Sigma W_y Y_{pp}^2 & \Sigma W_x X_{pp} & \Sigma W_y Y_{pp} \\ \Sigma W_x X_{pp} & \Sigma W_x & 0 \\ \Sigma W_y Y_{pp} & 0 & \Sigma W_y \end{bmatrix},$$

$$\beta = \begin{bmatrix} \Sigma W_x X_{pp}(X_{pp} - X_m) + \Sigma W_y Y_{pp}(Y_{pp} - Y_m) \\ \Sigma W_x(X_{pp} - X_m) \\ \Sigma W_y(Y_{pp} - Y_m) \end{bmatrix}, \text{ and}$$

$$S = \begin{bmatrix} K \\ T_x \\ T_y \end{bmatrix}.$$

The solution S can be computed by inverting matrix $\alpha$ so that $S = \alpha^{-1} * \beta$.

In practice, there are two separate approaches to implementing the present invention. The first approach employs a dynamic approach utilizing successive image frames occurring in real time, while the second approach employs a "world map" approach similar to that described above in connection with FIG. 1.

In both of these implementational approaches, it is assumed that the error changes smoothly with respect to sensor position. This is reasonable because a) biased estimation errors from the same image portion will be reproducible from image frame to image frame in approximately the same sensor position, and b) model errors are usually low-frequency errors caused by lens distortion and sensor rotation, for example, and these error components vary smoothly as the sensor moves.

In the dynamic approach, each time the operator notes that a first landmark region then being used to infer the location in the image of the inserted pattern is about to be occluded, the first landmark region is continued to be used for one or more additional image frames while (1) a non-occluded second landmark region is selected; (2) the location of the inserted pattern is inferred from the non-occluded second landmark region to provide model image positions $(X_p, Y_p)$; (3) the error a between the location of the inserted pattern inferred from the non-occluded second landmark region and the occluded first landmark region is computed; (4) the computed error a is stored; and (5) thereafter, the location of the inserted pattern is determined by adding the stored error $\epsilon$ to the location of the inserted pattern inferred from the non-occluded second landmark region to thereby provide the corrected model image positions $(X_{pp}, Y_{pp})$.

In the "world map" approach, a number of images at different zooms and different translation positions are each individually recorded and stored. Then, for each of these stored images, the location of the inserted pattern is inferred from the points $(X_m, Y_m)$ of a landmark region located at or very near the location of the inserted pattern itself, so that no error correction is required for these points. Therefore, in this case, $X_{pp}=X_p$ and $Y_{pp}=Y_p$, and the corrected point positions are equal to the actual point positions. This provides the transformation solution S that provides the reference location for the inserted pattern in that image. However, position corrections, computed as described above, are required for the points $(X_m, Y_m)$ of other landmark regions of each image that are not near the location of the inserted pattern in that image, where $X_{pp} \neq X_p$ and $Y_{pp} \neq Y_p$. The error corrected positions $(X_{pp}, Y_{pp})$ for each of the other landmark regions for each image recorded at a different zoom or translated position are stored. This permits the system, while running, to switch in the appropriate error corrected positions depending on the measured zoom and translation position of the current image.

It is to be understood that the apparatus and method of operation taught herein are illustrative of the invention. Modifications may readily be devised by those skilled in the art without departing from the spirit or scope of the invention. For example, the scene or other source of images could be a sequence of images on film which are viewed by an image sensor such as a television camera.

I claim:

1. In an image processing method for inserting a given pattern at a target region having a particular location with respect to a scene being viewed by an image sensor which produces a series of successive image frames, wherein said scene includes at least two landmark regions displaced in position from one another; and wherein said method comprises the computation steps of (a) inferring the size and position of said particular location within each image frame of said scene from the size and position of a first one of said landmark regions represented within each image frame of said scene and (b) independently inferring the size and position of said particular location within each image frame of said scene from the size and position of a second one of said landmark regions represented within each image frame of said scene, whereby there may be a difference in the size and position of said particular location within each image frame of said scene inferred from the size and position of said second one of said landmark regions with respect to the size and position of said particular location within each image frame of said scene inferred from the size and position of said first one of said landmark regions; the improvement comprising the step of:

c) modifying the size and position of the particular location within one of said image frames of said scene inferred from the size and position of said second one of said landmark regions within that one of said image frames so that it is substantially the same as the size and position of the particular location within that one of said image frames of said scene inferred from the size and position of said first one of said landmark regions.

2. The method of claim 1, wherein: step (c) comprises the steps of:

d) employing a least squares solution of a given error function of zoom, horizontal position translation, and vertical position translation to compute said difference in the, size and position of said particular location in said one of said image frames of said scene; and e) adding said computed difference in the size and position of said particular location in said one of said image frames of said scene to the particular location within that one of said image frames of said scene inferred from the size and position of said second one of said landmark regions thereby to modify the size and position of the particular location within that one of said image frames of said scene inferred from the size and position of said second one of said landmark regions so that it is substantially the same as the size and position of the particular location within that one of said image frames of said scene inferred from the size and position of said first one of said landmark regions 3. The method of claim 2, comprising the steps of:

e) initially inserting said pattern in a predetermined location of each of a set of one or more successive image frames inferred by step (a);

f) during the occurrence an image frame of said first set, employing step (b) to infer the predetermined location and then employing step (d) to compute said difference;

g) storing said difference; and h) thereafter, during one image frame occurring subsequent to said first set, inserting said pattern in a modified predetermined location of said one image frame computed by adding said stored difference to the predetermined location inferred by step (b).

4. The method of claim 2, comprising the steps of.

e) recording a plurality of images of said scene each at a different zoom and/or translation position to derive a "world map" of said scene;

f) for each one of said plurality of said recorded images, employing step (a), (b) and (d) to individually derive said difference for that one of said plurality of said recorded images;

g) for each one of said plurality of said recorded images, add said difference for that recorded image to said predetermined location inferred by step (b) to derive a corrected predetermined location for that one of said plurality of said recorded images;

h) store the corrected predetermined location for each one of said plurality of said recorded images in association therewith;

i) compare the current image frame with said recorded images to determine which recorded image most nearly corresponds to the current image frame; and j) employ the stored corrected predetermined location of said recorded image that most nearly corresponds to the current image frame to insert said pattern at a location of the current image frame that corresponds to said stored corrected predetermined location.

5. The method of claim 4, wherein:

said first one of said landmark regions in each of said plurality of said recorded images is located substantially at said predetermined location of said target region.

* * * * *